United States Patent [19]
Azuma et al.

[11] Patent Number: 5,093,216
[45] Date of Patent: Mar. 3, 1992

[54] CARBONACEOUS MATERIAL AND A NON AQUEOUS ELECTROLYTE CELL USING THE SAME

[75] Inventors: Hideto Azuma; Atsuo Omaru; Yoshio Nishi, all of Kanagawa, Japan

[73] Assignee: Sony Corporation, Tokyo, Japan

[21] Appl. No.: 558,470

[22] Filed: Jul. 27, 1990

[30] Foreign Application Priority Data

Jul. 29, 1989 [JP] Japan .................................. 1-197596
Feb. 28, 1990 [JP] Japan .................................. 2-048184

[51] Int. Cl.⁵ ............................................ H01M 4/36
[52] U.S. Cl. ................................ 429/218; 252/182.1; 252/502
[58] Field of Search ............................ 252/502, 182.1; 429/194, 218

[56] References Cited

U.S. PATENT DOCUMENTS

| | | |
|---|---|---|
| 3,207,687 | 9/1965 | Maier . |
| 4,702,977 | 10/1987 | Hiratsuka et al. ................ 429/194 |
| 4,737,423 | 4/1988 | Tung .................................. 429/194 |
| 4,945,014 | 7/1990 | Miyabayashi et al. ............. 429/218 |
| 4,959,281 | 9/1990 | Nishi et al. ......................... 429/194 |
| 4,980,250 | 12/1990 | Takawashi et al. ................ 429/194 |

FOREIGN PATENT DOCUMENTS 0357001 7/1990 European Pat. Off. .

Primary Examiner—Stephen Kalafut
Attorney, Agent, or Firm—Hill, Van Santen, Steadman & Simpson

[57] ABSTRACT

A carbonaceous material and a non-aqueous electrolyte cell using the carbonaceous material as an anode are disclosed. The carbonaceous material has an interlayer spacing, $d_{002}$, of not less than 3.70 angstroms and a true density of less than 1.70 g/cm³, and contains from 0.2 to 5.0 weight % of phosphorus. The carbonaceous material has a large doping capacity for Li, and the non-aqueous electrolyte cell using the material has a large capacity and improved charge-discharge cycle characteristics.

8 Claims, 7 Drawing Sheets

CARBONACEOUS MATERIAL AND A NON AQUEOUS ELECTROLYTE CELL USING THE SAME

BACKGROUND OF THE INVENTION

This invention relates to a carbonaceous material capable of doping and de-doping lithium and a method for producing the same and also to a non-aqueous electrolytic cell having the carbonaceous material as a negative electrode.

A recent trend toward the miniaturization of electronic instruments requires a high energy density of cell. To satisfy such a requirement, a variety of secondary cells have been proposed. In such a cell, there is a non-aqueous electrolyte cell using lithium, which has been extensively studied for practical utility.

However, for the practical applications of the non-aqueous electrolyte cell, the following disadvantages are involved in the use of lithium metal as a negative electrode.

(1) Charging takes a time as long as 5-10 hours with poor quick charging properties.

(2) Short cycle life.

It is accepted that these are all ascribed to the lithium metal, resulting from the change in shape of the lithium negative electrode, the formation of dendrite and the inactivation of lithium accompanied by the repetition of charging and discharging.

One measure for solving the above problem, there has been proposed the use of a negative electrode wherein lithium is not used as a single material but is doped with a carbonaceous material. This makes use of easy electrochemical formation of a carbon layer compound of lithium. For instance, when a carbonaceous material used as a negative electrode is charged in non-aqueous electrolyte solution, lithium in the positive electrode is electrochemically doped in the interlayers of the negative carbon. The lithium-doped carbon acts as a lithium electrode and the lithium is de-doped from the carbon interlayers upon discharge, returning to the positive electrode.

The electric capacity per unit weight of the carbonaceous material is determined depending on the amount of doped lithium. In order to increase the charge and discharge capacity, it is desirable to increase the amount of doped lithium as large as possible. (The theoretical upper limit is a rate of one Li atom per 6 carbon atoms.)

Hitherto, the carbonaceous material used as the negative electrode of this type of cell includes carbonaceous materials obtained from organic materials as is known, for example, from Japanese Laid-open Patent Application No. 62-122066 or No. 62-90863.

However, the amount of doped lithium in the hitherto known carbonaceous materials is not so high that it is only approximately half the theoretical.

OBJECTS AND SUMMARY OF THE INVENTION

It is an object of the present invention to provide a carbonaceous material having a large doping capacity for Li.

It is another object of the present invention to provide an improved non-aqueous electrolyte cell having large capacity and improved charge-discharge cycle characteristics.

According to one aspect of the present invention, there is provided a carbonaceous material having an interlayer spacing, $d_{002}$, of not less than 3.70 angstroms and a true density of less than 1.70 g/cm$^3$, having no exothermic peak at not less than 700° C. as measured by a differential thermal analysis in air stream, and containing from 0.2 to 5.0 weight % of phosphorus.

According to another aspect of the present invention, there is also provided a non-aqueous electrolyte cell which comprises an anode of a carbonaceous material having an interlayer spacing, $d_{002}$, of not less than 3.70 angstroms and a true density of less than 1.70 g/cm$^3$, having no exothermic peak at not less than 700° C. as measured by a diffraction thermal analysis in air stream, and containing from 0.2 to 5.0 weight % of phosphorus, a cathode containing Li, and a non-aqueous electrolyte.

DESCRIPTION OF THE PREFERRED EMBODIMENTS

Figure 1:
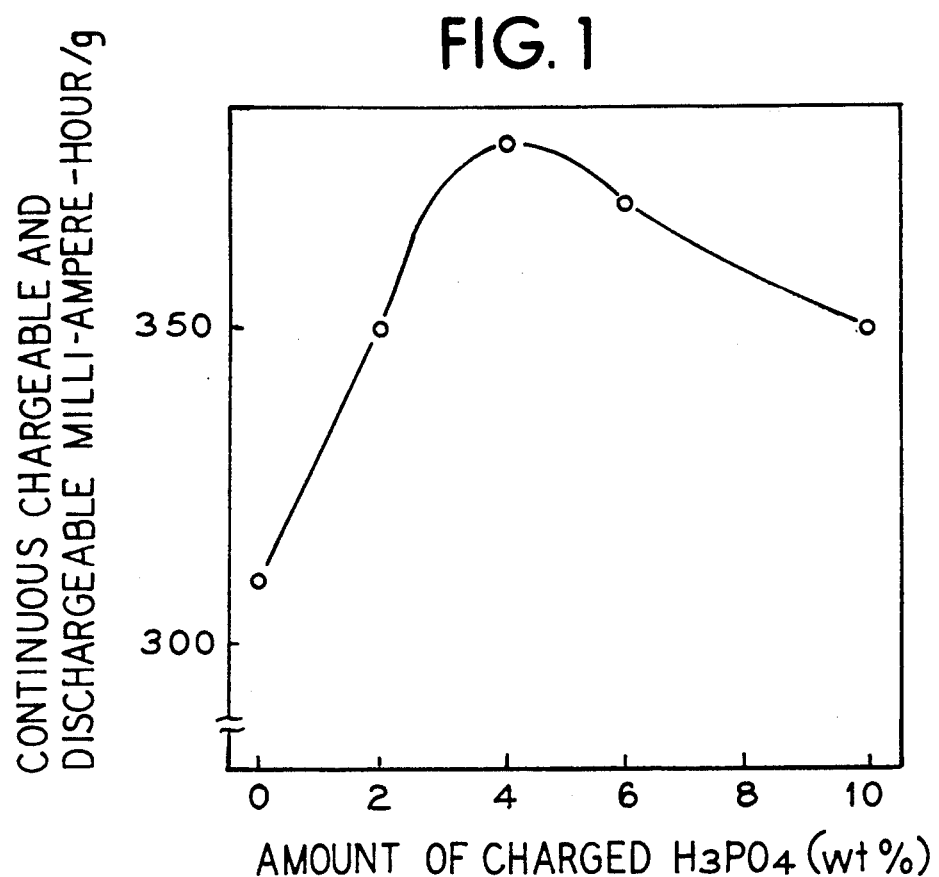
FIG. 1 is a characteristic view showing the relation between the amount of charged phosphoric acid and the continuous chargeable and dischargeable mA-hour as used with the resultant carbonaceous material.

The present inventors made intensive studies in order to achieve the above objects and, as a result, found that the addition of a phosphorus compound during carbonization is very effective in increasing the doping amount of lithium in the resulting carbonaceous material.

The present invention is accomplished based on the above finding and the carbonaceous material of the invention is characterized by carbonizing an organic material and containing 0.2-5.0 wt % of phosphorus.

The production method according to the invention is characterized in that an organic material or carbonaceous material is carbonized after addition of 0.2-15 wt % of a phosphorus compound, calculated as phosphorus, based on the organic material.

A non-aqueous electrolyte cell of the invention is characterized by comprising a negative electrode consisting of a carbonaceous material obtained by carbonizing an organic material and containing 0.2-5.0 wt % of phosphorus, a positive electrode containing Li and a non-aqueous electrolyte.

The carbonaceous material of the invention is obtained by carbonization, such as by a firing technique, of organic materials.

The starting organic materials include any organic high molecular weight compounds including conjugated resins such as phenolic resins, acrylic resins, halogenated vinyl resins, polyamide-imide resins, polyamide resins, polyacetylene, pol(p-phenylene) and the like, cellulose resins, and the like.

Besides, there may be used condensed polycyclic hydrocarbon compounds such as naphthalene, phenanthrene, anthracene, triphenylene, pyrene, chrysene, naphthacene, picene, perylene, pentaphene, pentacene, etc. and derivatives thereof (e.g. carboxylic acids, carboxylic anhydrides, carboxylic acid imides and the like thereof), various pitches mainly composed of mixtures of the above compounds, and condensed heterocylic compounds such as indole, iso-indole, quinoline, iso-quinoline, quinoxaline, phthalazine, carbazole, acridine, phenazine, phenantrizine and the like, and derivatives thereof.

In addition, furan resins such as homopolymers and copolymers of furfuryl alcohol and furfural may be favorably used. More specifically, there may be mentioned polymers of furfural+phenol, furfuryl alcohol+dimethylolurea, furfuryl alcohol, furfuryl alcohol+formaldehyde, furfural+ketones, and the like. The carbonaceous materials obtained by carbonizing the furan resins has a surface separation, $d_{002}$, at plane (002) of not smaller than 3.70 angstroms and a true density, $\rho$, of not larger than 1.70 g/cm$^3$. The differential thermal analysis (DTA) reveals that it has not any exothermic peak at temperatures not lower than 700° C. and exhibits very good characteristics for use as a negative electrode for cell.

These organic materials are thermally treated for carbonization by techniques such as of firing. The carbonization temperature may differ depending on the type of starting material and is usually in the range of 500°-3000° C.

Like the furan resins, when petroleum pitches having a specific H/C atomic ratio into which functional groups containing oxygen are introduced (so-called oxygen crosslinkage) are carbonized, good characteristics are obtained. Thus, the pitches can be used as the organic material.

The petroleum pitches are obtained by operations, such as distillation (vacuum distillation, topping, and steam distillation), thermal polycondensation, extraction, chemical polycondensation and the like, of tars which are obtained by high temperature pyrolysis of coal tar, ethylene bottom oils, crude petroleum and the like, and asphalt.

The H/C atomic ratio of petroleum pitch is important and should be in the range of 0.6-0.8 for non-graphitizable carbon.

The techniques of introducing functional groups containing oxygen into these petroleum pitches are not critical and include, for example, a wet process using an aqueous solution of nitric acid, mixed acid, sulfuric acid, hypochlorous acid and the like, a dry process using oxidative gases (air and oxygen), and reactions with solid reagents such as sulfur, ammonium nitrate, ammonium persulfate, ferric chloride and the like.

The petroleum pitches into which oxygen-containing functional groups have been introduced by the above technique are carbonized for use as a negative electrode material. The carbonization conditions are not critical provided that they are so set that the resulting carbonaceous materials satisfy characteristic requirements that the surface separation, $d_{002}$, at (002) plane is not less than 3.70 angstroms, a true density, $\rho$, is not larger than 1.70 g/cm$^3$ and any exothermic peak by the differential thermal analysis (DTA) does not appear at temperatures of not lower than 700° C. For instance, the pitches are carbonized in a stream of nitrogen at 300°-700° C., after which it is fired in a stream of nitrogen under conditions of a heating rate of 1°-20° C., an ultimate temperature of 900°-1300° C. and a time of 0-5 hours kept at the ultimate temperature. As a matter of course, the carbonization operation may be omitted as the case may be.

The resultant carbonaceous material serves as a negative electrode material after pulverization and classification. The pulverization may be effected prior to or after the carbonization or after the firing.

Although the carbonaceous material as stated above is described, for example, in Japanese Patent Publication No. 53-31116, the optimization of the oxygen content results in a carbonaceous material which has a surface separation, $d_{002}$, at (002) plane of not less than 3.80 angstroms and no exothermic peak at 700° C. or over when determined by differential thermal analysis (DTA) in a stream of air. The material is used as the negative electrode material.

The content of oxygen to be incorporated in petroleum pitch greatly influences the surface separation, $d_{002}$, at the (002) plane. For instance, when the oxygen content in a precursor obtained by simple crosslinkage of petroleum pitch is not less than 10 wt %, the $d_{002}$ value can be not less than 3.70 angstroms. Accordingly, the oxygen content in the precursor should preferably be not less than 10 wt %. In practice, the content is in the range of 10-20 wt %. Especially, since the $d_{002}$ value of not less than 3.72 angstroms is favorable in view of the charging and discharging efficiency, the oxygen content should be appropriately set while taking the above into consideration.

In the practice of the invention, phosphorus compounds are added at the time of the carbonization by which the doping amount of lithium in the carbonaceous material can be increased.

Examples of the phosphorus compound include phosphorus oxides such as phosphorus trioxide, phosphorus tetraoxide, phosphorus pentaoxide and the like, oxo acids of phosphorus such as ortho-phosphoric acid (so-called phosphoric acid), meta-phosphoric acid, polyphosphoric acid and salts of these oxo acids. In view of the ease in handling, phosphorus oxides and phosphoric acid are preferred.

In the practice of the invention, the amount of phosphorus compound to be added at the time of the carbonization of organic materials should be 0.2-15 wt %, preferably 0.5-7 wt %, based on the organic or carbonaceous material and the content of phosphorus in the carbonaceous material should be 0.2-5 wt %. If the amount of the phosphorus compound is less than the above range and the content of phosphorus in the carbonaceous material is too small, the effect of increasing the doping amount of lithium cannot be appreciably expected. On the contrary, when the amount of the phosphorus compound is too large and the content of phosphorus in the carbonaceous material becomes too large, the characteristics become poor with the possibility of reducing a rate of carbonaceous material which actually takes part in the doping of lithium.

Where the carbonaceous material is used as a negative electrode of non-aqueous electrolyte cell, it is preferred that the material used for positive electrode should contain a satisfactory amount of Li. For this purpose, a composite metal oxide of the general formula, $LiMO_2$, (wherein M represents at least one of Co and Ni) or layer compounds containing Li are used. In particular, good characteristics are obtained when using $LiCoO_2$.

The non-aqueous electrolyte cell of the invention aims at achieving high capacity wherein the positive electrode should contain Li in amounts corresponding to a charge and discharge capacity of not less than 250 mAh per g of the carbonaceous material for negative electrode in stationary condition (e.g. after about five repetitions of charging and discharging). Li should preferably be contained in amounts corresponding to a charge and discharge capacity of not less than 300 mAh and more preferably in amounts corresponding to a charge and discharge capacity of not less than 350 mAh. It will be noted that Li is not necessarily supplied all from the positive electrode material on the condition that Li should be present in the cell system in amounts corresponding to a charge and discharge capacity of not less than 250 mAh per g of the carbonaceous material for negative electrode. The content of Li will be determined by measurement of the discharge capacity of cell.

The non-aqueous electrolyte is prepared by appropriately combining organic solvents and electrolytes, and these organic solvents and electrolytes may be ones ordinarily used in this type of cell.

Examples of the organic solvent include propylene carbonate, ethylene carbonate, 1,2-dimethoxyethane, 1,2-diethoxyethane, γ-butyrolactone, tetrahydrofuran, 2-methyltetrahydrofuran, 1,3-dioxorane, 4-methyl-1,3-dioxorane, diethyl ether, sulforane, methylsulforane, acetonitrile, propionylnitrile, anisole and the like.

Examples of the electrolyte include $LiClO_4$, $LiAsF_6$, $LiPF_6$, $LiBF_4$, $LiB(C_6H_5)_4$, $CH_3SO_3Li$, $CF_3SO_3Li$, LiCl, LiBr and the like.

When a phosphorus compound such as phosphoric acid is added at the time when organic materials are carbonized into carbonaceous material, an amount of doping lithium becomes great, with a great efficiency as expressed by de-doping amount/doping amount.

The use of the carbonaceous material having great capability of doping lithium as a negative electrode of non-aqueous electrolyte cell results in an increasing charge and discharge capacity while suppressing deterioration accompanied by repetition of charging and discharging operations.

EXAMPLES

The present invention is described based on particular experimental results.

PRELIMINARY EXPERIMENT 1

Initially, a furan resin was used as an organic material to check the influence of phosphorus being added.

FIG. 1 is a graph showing the variation of a continuous chargeable and dischargeable ampere-hour/g relative to the amount of charged phosphoric acid with respect to a cell which makes use of a negative electrode which is obtained by firing a polyfurfuryl alcohol resin (maleic anhydride catalyst) while adding phosphoric acid. From this, it will be seen that the addition of phosphoric acid upon firing is very effective in increasing the charge and discharge capacity.

Figure 2:
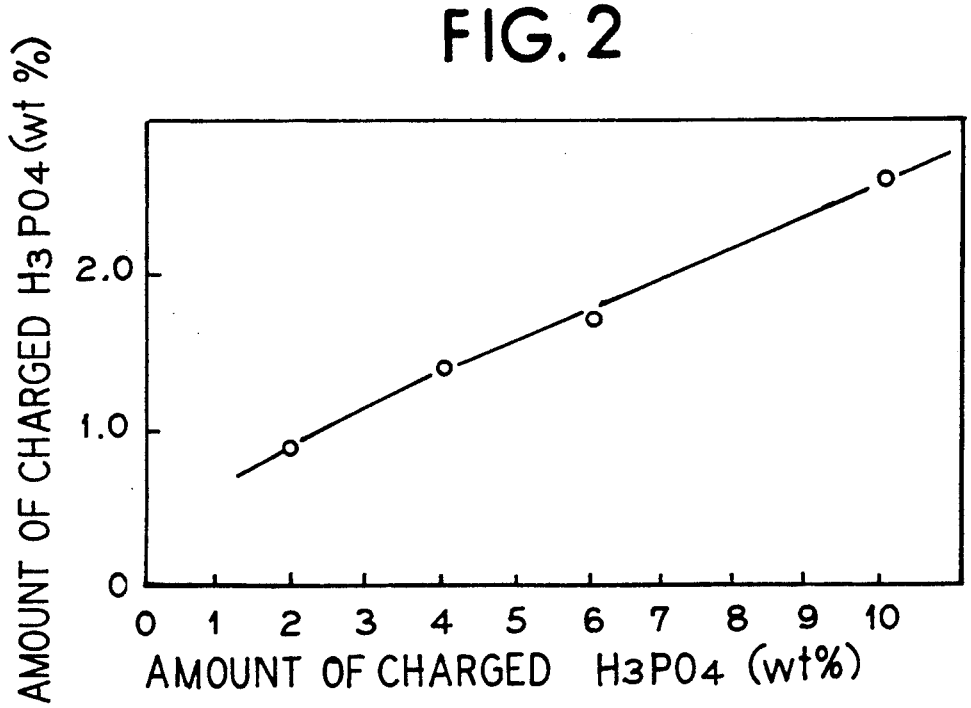
FIG. 2 is a characteristic view showing the relation between the amount of charged phosphoric acid in the fired product of furfuryl alcohol resin and the residual rate of phosphorus.

The added phosphorus compound was left in the resulting carbonaceous material as is shown in FIG. 2. It will be noted that the amount of phosphorus in the carbonaceous material was quantitatively determined by an inductively coupled plasma (ICP) spectrometry.

Figure 3:
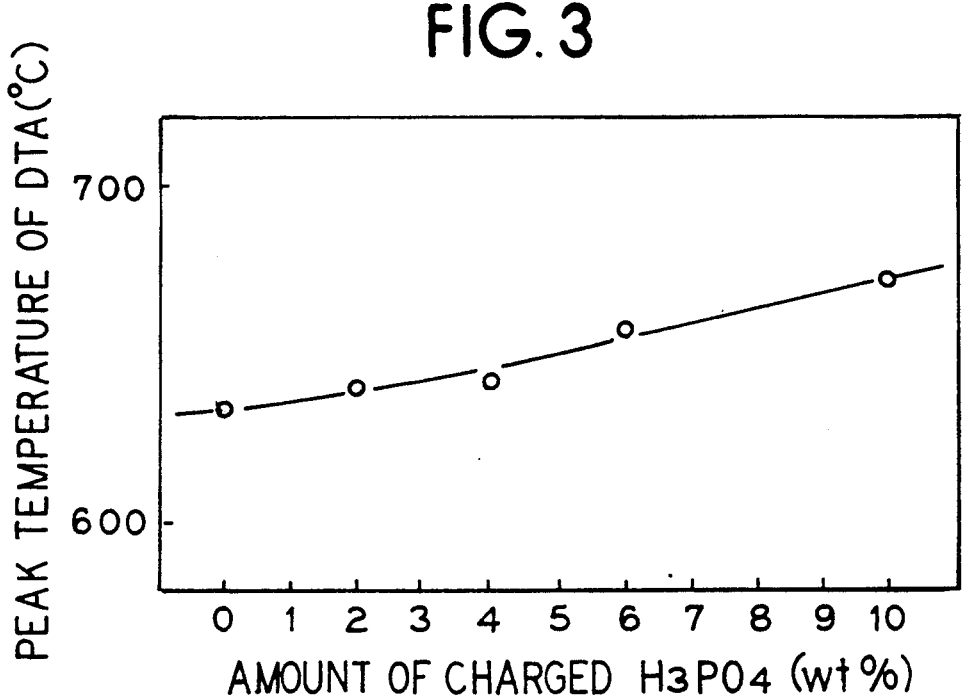
FIG. 3 is a characteristic view showing the variation in the temperature of DTA peak relative to the amount of charged phosphoric acid and FIG. 4 is a characteristic view showing the variation in $d_{002}$ relative to the amount of charged phosphoric acid.
Figure 4:
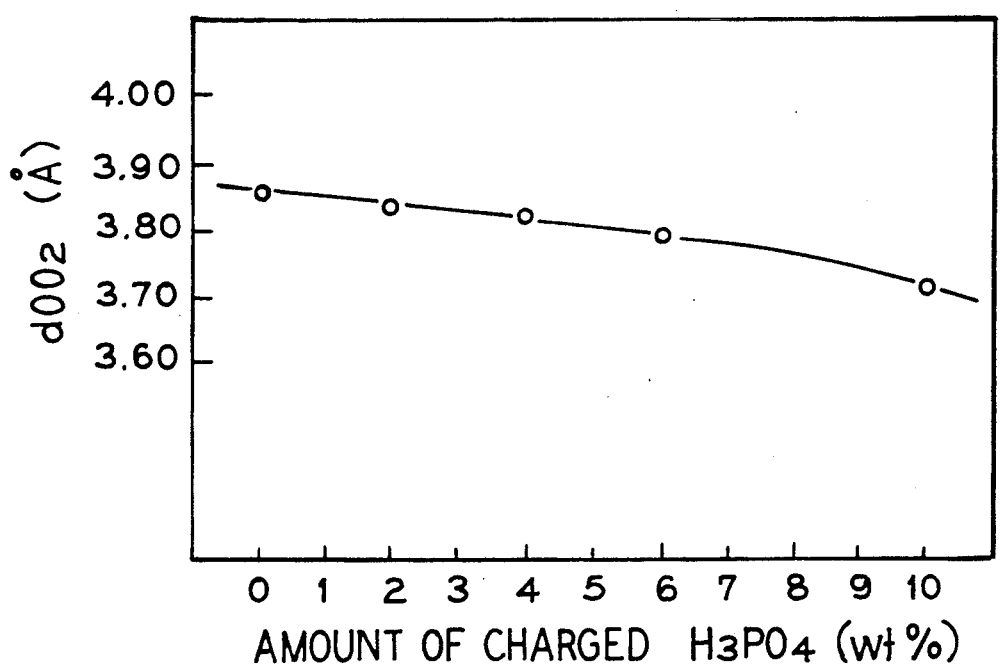

The fired product of the polyfurfuryl alcohol resin has not exothermic peak at 700° C. or over when determined by DTA and has a surface separation, $d_{002}$, at (002) plane of as large as 3.85 angstroms. When phosphoric acid was added during firing of the polyfurfuryl alcohol resin, little variation in the characteristics is observed as shown in FIGS. 3 and 4. For instance, the addition of 10 wt % of phosphoric acid entails an exothermic peak of approximately 680° C. determined by DTA and a $d_{002}$ value of not less than 3.70 angstroms.

By this, it was confirmed that the addition of the phosphorus compound did not impede the characteristics inherent to the carbonaceous material.

Based on the results of the above Preliminary Example 1, a cell using a negative electrode made of a carbonaceous material which had been obtained by firing a furan resin to which a phosphorus compound was added was assembled to evaluate its characteristics.

EXAMPLE 1

500 g of furfuryl alcohol, 1 g of maleic anhydride and 200 g of pure water were mixed and refluxed on a hot water bath for 2 hours to obtain a viscous polymer.

After removal of unreacted alcohol and residual water by vacuum distillation, 5 g of a 85% phosphoric acid ($H_3PO_4$) aqueous solution was added to 100 g of the polymer.

This was maintained for carbonization in a stream of nitrogen at 500° C. for 5 hours, followed by heating to 1200° C. and thermal treatment for 1 hour. The resultant carbonaceous material had the following characteristics.

$d_{002}$ = 3.82 angstroms.
true density, $\rho$, = 1.55 g/cm$^3$.
exothermic peak by DTA: 643° C.
phosphorus content: about 1.4 wt %.

The thus obtained carbonaceous material was used to constitute a cell as follows.

The carbonaceous material was initially powdered by means of a mortar and classified through a sieve to collect particles with a size of 390 mesh or below.

100 mg of polyvinylidene fluoride used as a binder was added to 1 g of the classified carbonaceous material, and dimethylformamide was used to make a paste, followed by application to a stainless steel gauze and pressing at a pressure of 5 tons/cm$^2$. The applied gauze was punched into a suitable form for use as a negative electrode.

A positive electrode was made using $LiNi_{0.2}Co_{0.8}O_2$ in the following manner.

600 mg of graphite and 300 mg of polyethylene tetrafluoride were added to and mixed with 9.1 g of $LiNi_{0.2}Co_{0.8}O_2$, after which 1 g of the mixture was placed in a mold and subjected to compression molding at a pressure of 2 tons/cm$^2$ to obtain an electrode of a disk shape.

The thus obtained positive and negative electrodes were used and a solution of 1 mole/l of $LiClO_4$ in a mixed solution of propylene carbonate-dimethoxyethane (ratio by volume of 1:1) was used to make a coin-shaped cell for a charge and discharge test.

The cell was arranged so that the amount of active substance was positive electrode >> negative electrode from the standpoint of electrochemical equivalence, and the cell capacity was regulated at the negative electrode. In the charge and discharge test, charging and discharging were conducted at a constant current (0.53 mA/cm$^2$).

Figure 5:
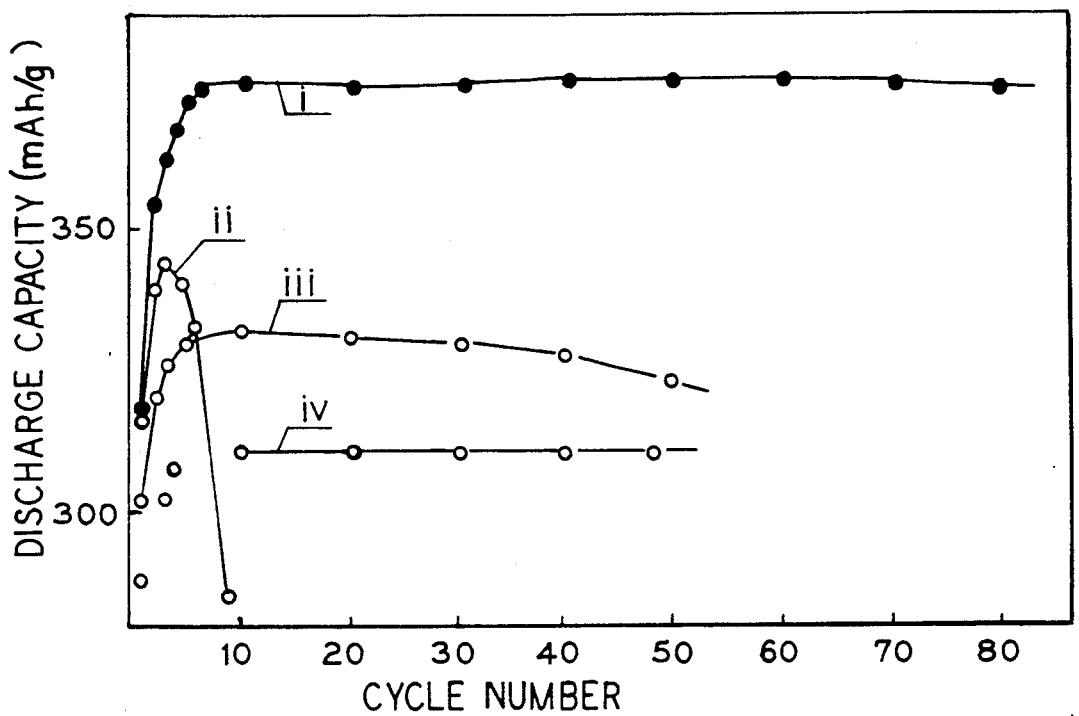
FIG. 5 is a characteristic view showing a charging and discharging cycle characteristic of a non-aqueous electrolyte secondary cell using as a negative electrode a carbonaceous material obtained by adding phosphoric acid to polyfurfuryl alcohol resin in comparison with that of a cell using as a negative electrode a carbonaceous material obtained without addition of any phosphoric acid.

The cell was charged at 320, 350 and 380 mAH/g (charged mA-hour per g of the carbonaceous material herein and whenever it appears hereinafter), wherein when a discharge cut-off voltage was set at 1.5 V under which a cycle test was effected, a good cycle characteristic was obtained in all the cases. In FIG. 5, the curve i shows the characteristic obtained by charging at 380 mAH/g. The cell of this example did not deteriorate over 80 cycles when charged at 380 mAH/g.

Accordingly, it will be seen that the cell of this example is chargeable or dischargeable at a capacity which is higher than the theoretical in the case of graphite used as the negative electrode.

Figure 6:
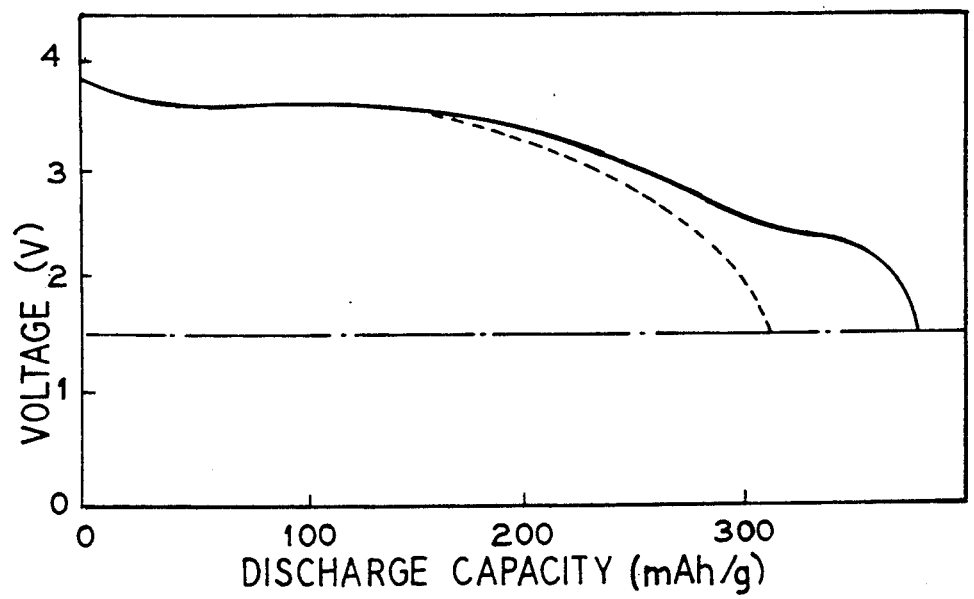
FIG. 6 is a characteristic view showing a discharge curve of a non-aqueous electrolyte secondary cell using a negative electrode of a carbonaceous material obtained by addition of phosphoric acid to polyfurfuryl alcohol resin in comparison with a cell using a negative electrode of a carbonaceous material obtained without addition of any phosphoric acid.

In FIG. 6, there is shown a discharge curve when the cell is charged at 380 mAH/g (solid curve in the figure). The cell of this example had a charge and discharge efficiency of 98.5% with good results.

COMPARATIVE EXAMPLE 1

After obtaining the polymer in the same manner as in Example 1, it was thermally treated without addition of any phosphoric acid to obtain a carbonaceous material.

This carbonaceous material was used to make a cell in the same manner as in Example 1. The results of the charge and discharge test are shown in FIG. 5. In FIG. 5, curve ii is a cycle characteristic in the case of charging at 380 mAH/g, curve iii is a cycle characteristic in the case of charging at 350 mAH/g and curve iv is a cycle characteristic in the case of charging at 380 mAH/g.

It will be seen that a stable cycle characteristic is limited only to the case where the charged ampere-hour is approximately 320 mAH/g.

The discharge curve when charged at 320 mAH/g is shown in FIG. 6 (broken-line curve in the figure). The charge and discharge efficiency is approximately 97%.

In order to confirm the effect of the case using other resin, a cell was similarly assembled using a novolac-type phenolic resin to evaluate its characteristics.

EXAMPLE 2

10 g of pure water and 1 g of ethanol were added to 10 g of a novolac-type phenolic resin powder (XPGA 4552 B, available from Gunei Chem. Co., Ltd.) and wetted, after which 500 mg of a 85% phosphoric acid aqueous solution was added and well mixed.

After keeping the mixture in a stream of nitrogen at 500° C. for 5 hours, it was heated up to 1200° C. and thermally treated for 1 hour to obtain a carbonaceous material. The thus obtained carbonaceous material had the following characteristics.

$d_{002}$ = 3.75 angstroms.
pure density, $\rho$, = 1.60 g/cm$^2$.
exothermic peak by DTA = 631° C.
content of phosphorus: about 1.4 wt %.

The thus obtained carbonaceous material was used to make a cell in the same manner as in Example 1.

As a result of the charge and discharge test at different charged and discharged ampere-hours, it was found that stable charging and discharging operations were ensured at a charged amount of not higher than 360 mAH/g.

Figure 7:
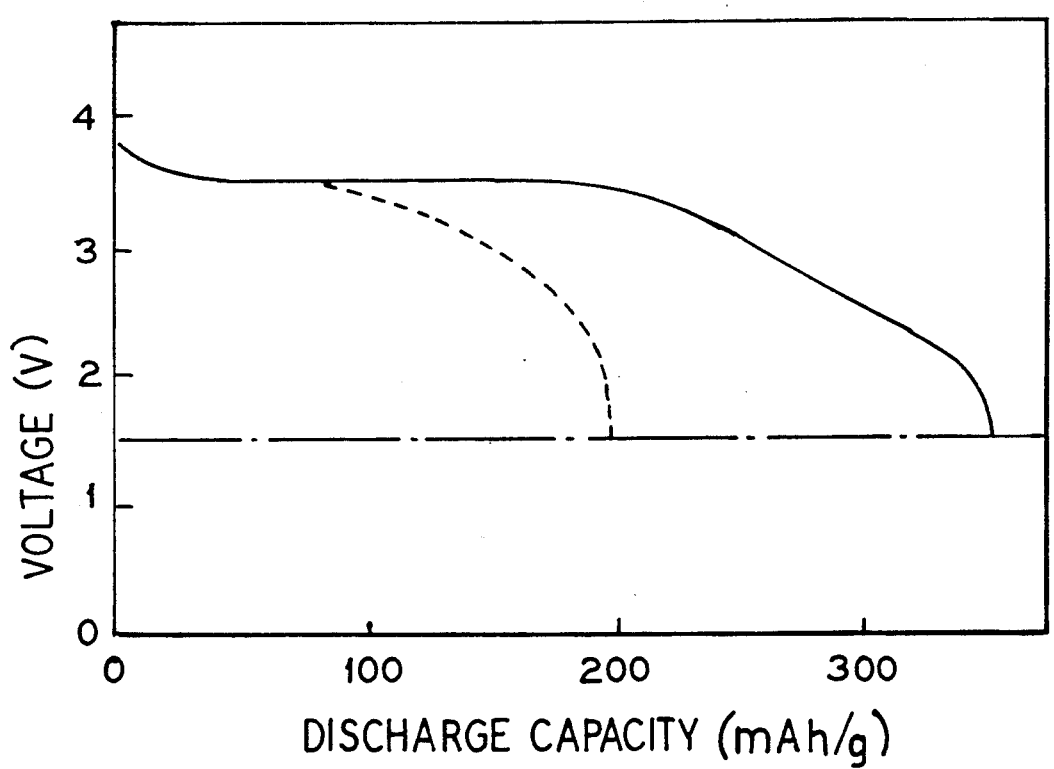
FIG. 7 is a characteristic view showing a discharge curve of a non-aqueous electrolyte secondary cell using a negative electrode of a carbonaceous material obtained by addition of phosphoric acid to novolac-type phenolic resin in comparison with a cell using a negative electrode of a carbonaceous material obtained without addition of phosphoric acid.

The discharge curve wherein charging was effected at 360 mAH/g is shown in FIG. 7 as a solid line. In this case, the charge and discharge efficiency was 98%.

COMPARATIVE EXAMPLE 2

In the same manner as in Example 2 except that phosphoric acid was not added to the novolac-type phenol resin powder, there was made a cell, followed by a charge and discharge cycle test at different charged amounts.

As a result, stable operations of charging and discharging were limited to the case where the charged amount was at most 210 mAH/g.

The discharge curve where charging was effected at 210 mAH/g is shown in FIG. 7 as a broken line. The charge and discharge efficiency was approximately 95%.

As will become apparent from the above examples and comparative examples, carbonaceous materials ensuring a remarkably improved charge and discharge capacity over known counterparts can be obtained by addition of phosphoric acid. Especially, as is described in Example 1, there can be obtained a carbonaceous material, depending on the type of starting material, which has a charge and discharge capacity higher than the theoretical as expected by graphite.

PRELIMINARY EXPERIMENT 2

Initially, petroleum pitch (H/C atomic ratio of 0.6–0.8) was oxidized to provide a carbon precursor having an oxygen content of 15.4 wt %. To the precursor were added various phosphorus compounds (ortho-phosphoric acid, phosphoric anhydride (phosphorus pentaoxide) and various phosphorates), followed by carbonization in a stream of nitrogen at 500° for 5 hours.

Thereafter, the carbonized beads were powdered in a mill and charged into a crucible, followed by firing in a stream of nitrogen at a heating rate of 5° C./minute at an ultimate temperature of 1100° C. for a time of 1 hour for which the ultimate temperature was maintained.

After cooling, the product was powdered and classified through a mesh to a size of not larger than 38 μm. These carbonaceous materials were evaluated using test cells.

For the fabrication of the test cell, the carbonaceous materials were, respectively, pre-heated, immediately prior to preparation of a mix for negative electrode, in a stream of Ar under conditions of a heating rate of about 30° C./minute, a temperature of 600° C. and a holding time of 1 hour at the temperature. Thereafter, polyvinylidene fluoride used as a binder was added to the material in an amount of 10 wt % based on the carbonaceous material, followed by mixing with dimethylformamide solvent and drying to obtain a negative electrode mix. Subsequently, 37 mg of the mix was molded along with a Ni mesh used as a current collector into a pellet with a diameter of 15.5 mm, thereby obtaining a carbon electrode. The test cell had the following arrangement.

Cell arrangement
    coin-shaped cell (diameter of 20 mm, thickness of 2.5 mm)
    counter electrode: Li metal
    separator: porous film (polypropylene)
    electrolyte: 1 mole/l of $LiClO_4$ dissolved in a mixed solvent (1:1 by volume) of propylene carbonate and methoxyethane
    current collector: copper foil The test cell with the above arrangement was repeatedly charged and discharged five times and reached a stationary state, whereupon a discharge capacity per g of the carbonaceous material constituting the carbon electrode was measured. The doping of lithium in the carbon electrode (charging: strictly speaking, although the process of doping in carbon in this test method is not charging but discharging, the doping process is called charging and the de-doping process is called discharging only for convenience's sake in view of the situation of actual cell) was performed at a current density of 0.53 mA/cm² by repetition of the cycle of one hour charging/two-hour break until a balanced voltage reached 0 at the time of the break. The discharge (de-doping of lithium from the carbon) was performed at a current density of 0.53 mA/cm² by repetition of 1 hour discharging/two-hour break wherein a terminal voltage of 1.5 V was determined as a cut-off voltage.

As a result, all the phosphorus compounds could improve the discharge capacity of the carbonaceous material and the effect of the addition was in the order of anhydride > phosphoric acid > monobasic salt > dibasic salt.

Figure 8:
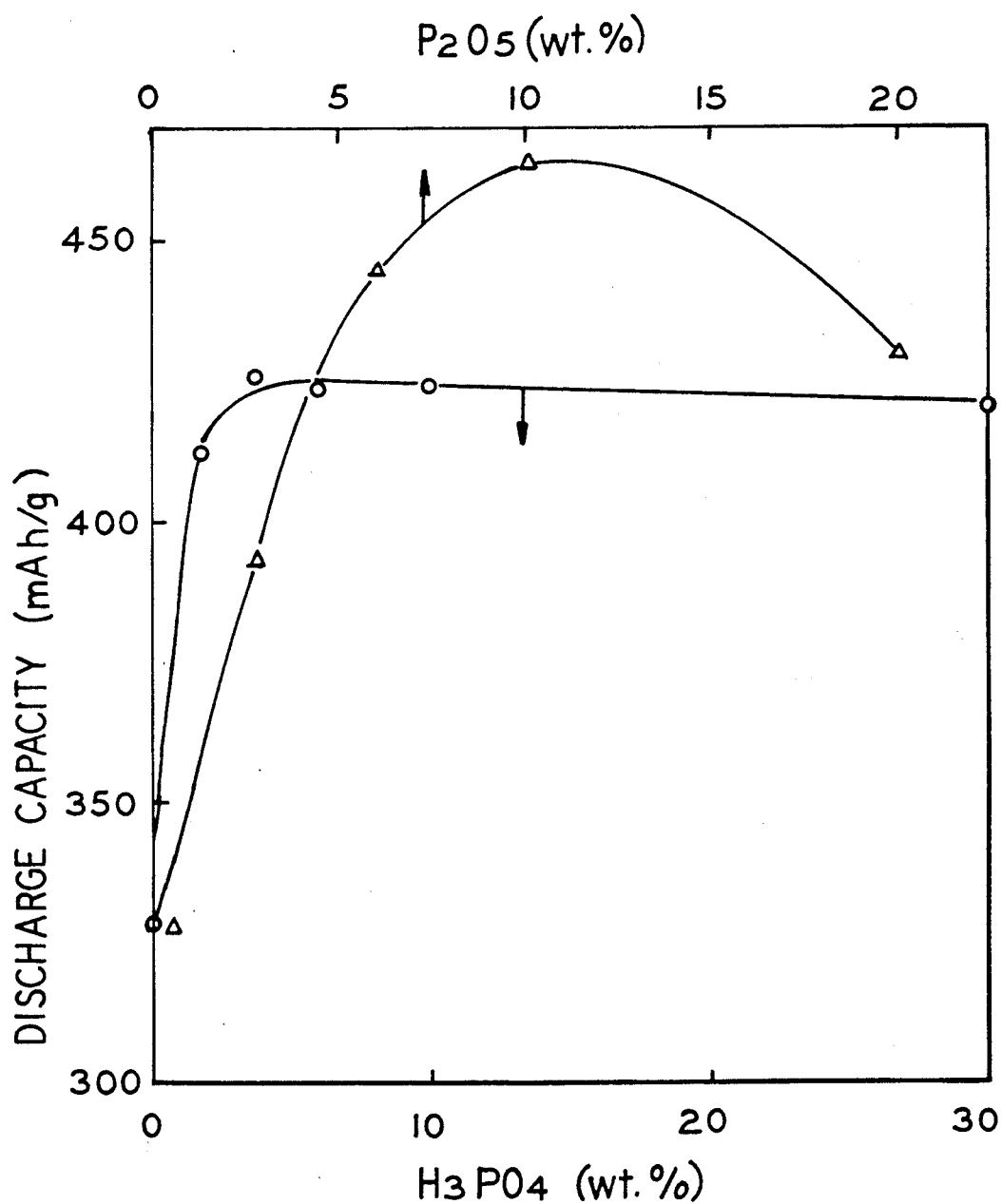
FIG. 8 is a characteristic view showing the relation between the amount of meta-phosphoric acid or phosphorus pentaoxide added to oxygen-crosslinked petroleum pitch and the discharge capacity.

FIG. 8 is a characteristic view showing the relation between the amount of phosphorus compounds (phosphorus pentaoxide and meta-phosphoric acid) added to the carbon precursor and the discharge capacity. With meta-phosphoric acid, the discharge capacity becomes maximal when the acid is added in about 5 wt %, over which it is kept almost constant. On the other hand, the capacity becomes maximal at 10 wt % for phosphorus pentaoxide, over which the discharge capacity is lowered. The comparison between meta-phosphoric acid and phosphorus pentaoxide reveals that the latter has a greater effect.

In Table 1, there is shown the discharge capacity in case where typical phosphorus compounds are added.

TABLE 1

| Phosphorus Compound | Amount (wt %) | Discharge Capacity (mAh/g) |
| --- | --- | --- |
| — | — | 341 |
| $Na_2HPO_3 \cdot 5H_2O$ | 8.8 | 388 |
| $Na_2HPO_4 \cdot 2H_2O$ | 6.7 | 431 |
| $P_2O_5$ (dry) | 5.8 | 494 |
| $P_2O_5 + H_2O$ | 5.8 | 466 |
| $H_3PO_4$ | 4.0 | 436 |

When the carbonaceous material is used as the negative electrode of non-aqueous electrolyte cell, the surface separation ($d_{002}$) of the carbonaceous material and the exothermic peak temperature ($T_p$) appearing in the DTA curve is considered to have the close relation with the cell characteristics.

Accordingly, how $d_{002}$ and $T_p$ are varied by the addition of a phosphorus compound and the relation between the characteristics and the variations were determined.

Figure 9:
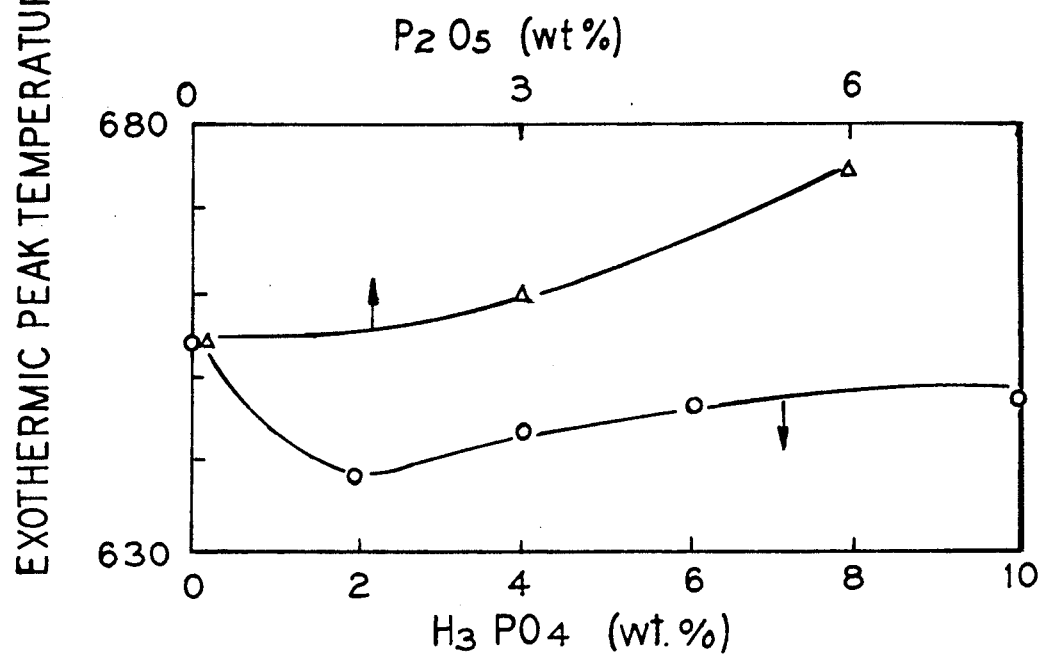
FIG. 9 is a characteristic view showing the variation in exothermic peak temperature of DTA when meta-phosphoric acid and phosphorus pentaoxide are each added to oxygen-crosslinked petroleum pitch.

As a result, it was found that $d_{002} = 3.73$ angstroms when meta-phosphoric acid was added in 2 wt %, $d_{002} = 3.71$ angstroms when added in 4 wt %, $d_{002} = 3.73$ angstroms when added in 6 wt %, and $d_{002} = 3.71$ angstroms when phosphorus pentaoxide was added in 6 wt %. The exothermic peak temperature in the DTA curve was changed as shown in FIG. 9.

In view of these results, the variations of the respective parameters caused by the addition of the phosphorus compounds are not so pronounced and the improvements of the characteristics are not directly proportional to the variations of the parameters, other factors being assumed to contribute to the improvements.

Figure 10:
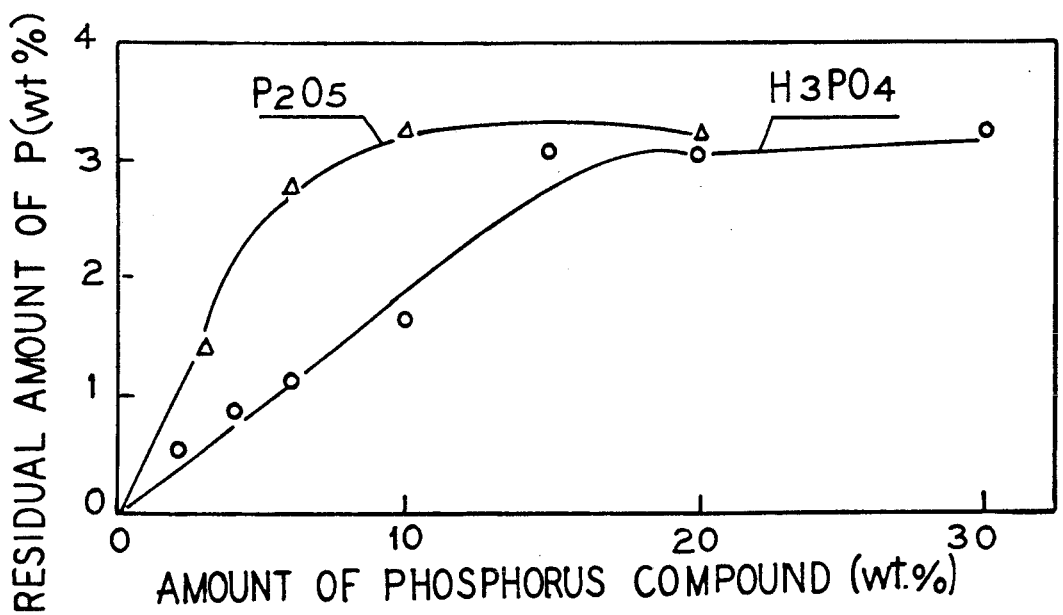
FIG. 10 is a characteristic view showing the relation between the amount of meta-phosphoric acid or phosphorus pentaoxide added to oxygen-crosslinked petroleum pitch and the amount of phosphorus remaining in carbonaceous material.

Moreover, the relation between the phosphorus compounds being added and the content of phosphorus left in the carbonaceous material was determined. The residual amount of phosphorus was measured in the same manner as in Preliminary Experiment 1. The results are shown in FIG. 10.

As the amount of the phosphorus compound increases, the content of phosphorus left in the carbonaceous material eventually increases, with the tendency that the residual amount of phosphorus is saturated at approximately 3 wt %.

Accordingly, the amount of phosphorus left in carbonaceous material should preferably be 0.2–3 wt %, more preferably 0.5–5 wt %.

Based on the results of the above Preliminary Experiment, a carbonaceous material which had been fired by adding a phosphorus to a carbon precursor obtained by introducing an oxygen-containing functional group into petroleum pitch was used to assemble a non-aqueous secondary cell for determination of its characteristics.

EXAMPLE 3

A petroleum pitch whose H/C atomic ratio was appropriately selected from a range of 0.6–0.8 was broken into pieces and subjected to oxidation treatment in a stream of oxygen to obtain a carbon precursor. The carbon precursor had a quinoline insoluble content (centrifugal method by JIS: K2425-1983) of 80% and an oxygen content (by organic element analysis) of 15.4 wt %.

6 wt % of phosphorus pentaoxide ($P_2O_5$ was added to the carbon precursor, which was carbonized in a stream of nitrogen at 500° for 5 hours, followed by heating to 1100° C. for 1 hour.

The resultant carbonaceous material was used to constitute a cell as follows.

The carbonaceous material was initially powdered by means of a mortar and classified through a sieve to collect particles with a size of 390 mesh or below.

100 mg of polyvinylidene fluoride used as a binder was added to 1 g of the carbonaceous material, and dimethylformamide was used to make a paste, followed by application to a stainless steel gauze, drying and pressing at a pressure of 5 tons/cm$^2$. The applied gauze was punched into a suitable form for use as a negative electrode. The net weight of the carbonaceous material was 32.4 mg.

A positive electrode was made using $LiNi_{0.2}Co_{0.8}O_2$ as an active substance. 6 g of graphite and 3 g of polyethylene tetrafluoride were added to and well mixed with 91 g of $LiNi_{0.2}Co_{0.8}O_2$, after which 1 g of the mixture was placed in a mold and subjected to compression molding at a pressure of 2 tons/cm$^2$ to obtain an electrode of a disk shape.

The thus obtained positive and negative electrodes were used. A solution of 1 mole/l of $LiClO_4$ in a mixed solution of propylene carbonate-1,2-dimethoxyethane (ratio by volume of 1:1) and a polypropylene nonwoven fabric were used to make a coin-shaped cell. The cell made use of the active substance in such an amount that positive electrode>>negative electrode from the standpoint of the electrochemical equivalence as regulated by the negative electrode.

COMPARATIVE EXAMPLE 3

In the same manner as in Example 3 except that phosphorus pentaoxide was not added upon carbonization of the carbon precursor, there was obtained a coin-shaped cell.

Figure 11:
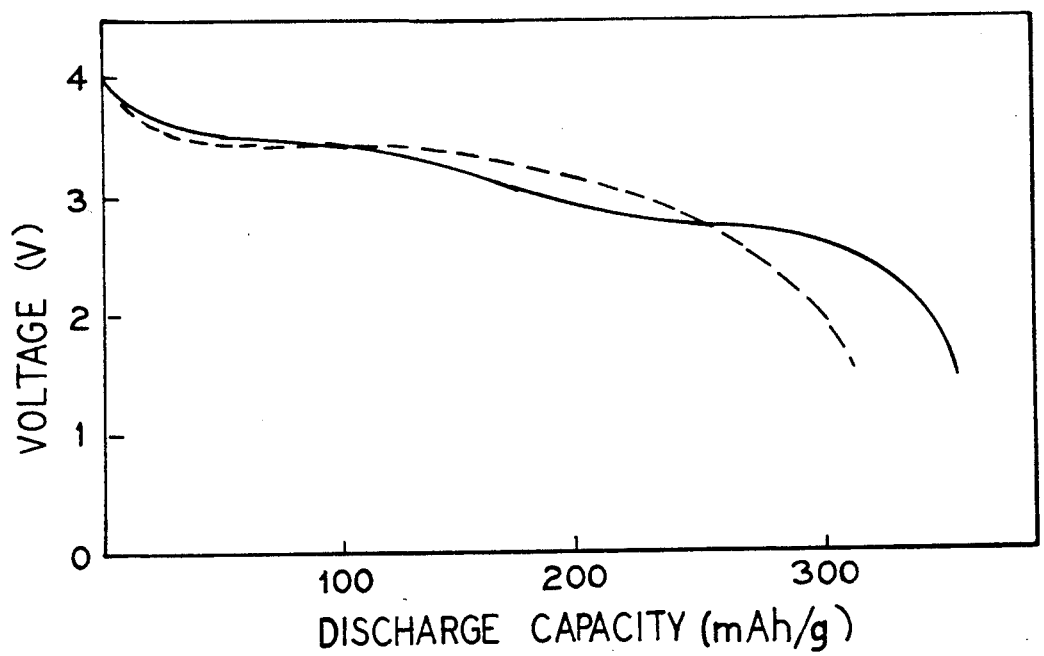
FIG. 11 is a characteristic view showing a discharge curve of a non-aqueous electrolyte secondary cell using a negative electrode of a carbonaceous material obtained by addition of phosphorus pentaoxide to oxygen-crosslinked petroleum pitch in comparison with a cell using a negative electrode of a carbonaceous material obtained without addition of phosphorus pentaoxide.

With regard to Example 3 and Comparative Example 3, discharge curves were drawn. The results are shown in FIG. 11. In the figure, the solid line indicates the discharge curve of Example 3 and the broken line indicates the discharge curve of Comparative Example 3.

From FIG. 11, it will be seen that the cell using the fired product to which the phosphorus compound is added is significantly better with respect to the capacity.

The cells of Example 3 and Comparative Example 3 were subjected to determined of a cycle characteristic. In the charge and discharge test, the current density was 0.53 mA/cm$^2$ for both charge and discharge under a constant current and the cut-off voltage of the discharge was set at 1.5 V. The results are shown in FIG. 12.

Figure 12:
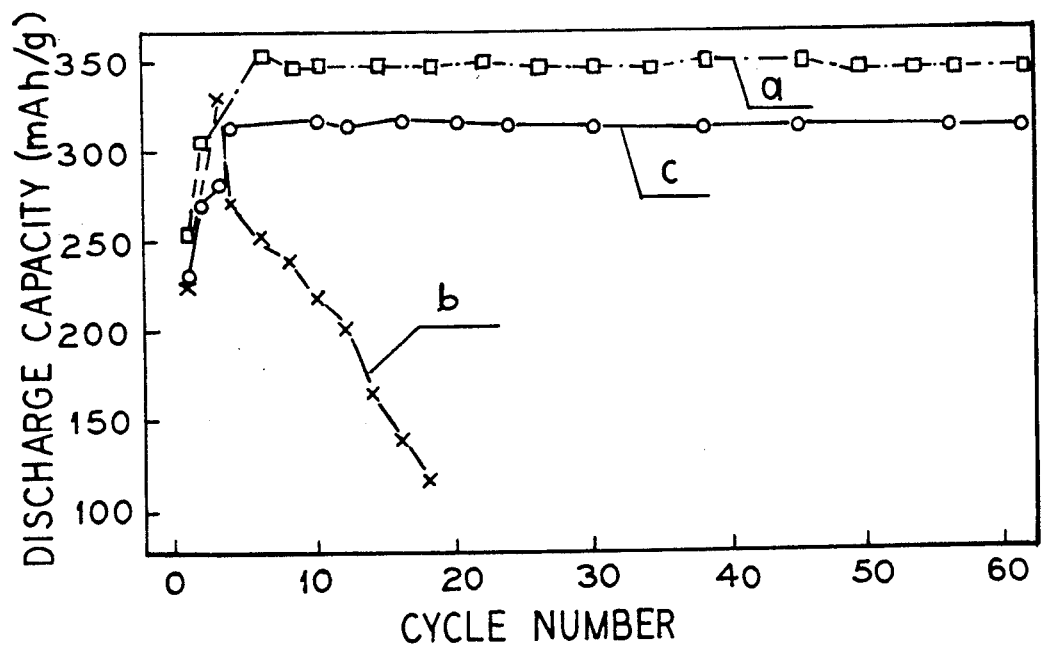
FIG. 12 is a characteristic view showing a cycle characteristic of a non-aqueous electrolyte secondary cell using a negative electrode of a carbonaceous material obtained by addition of phosphorus pentaoxide to oxygen-crosslinked petroleum pitch in comparison with a cell using a negative electrode of a carbonaceous material obtained without addition of phosphorus pentaoxide.

In FIG. 12, line a is a cycle characteristic in case where the cell of Example 3 was charged at 360 mAh/g, line b is a cycle characteristic in case where the cell of Comparative Example 3 was charged at 360 mAh/g and line c is a cycle characteristic in case where the cell of Comparative Example 3 was charged at 320 mAh/g.

With the cell of Example 3, it exhibits a good cycle characteristic when charged at 360 mAh/g. In Comparative Example 3, the life is very short. When the cell of Comparative Example 3 was charged at 320 mAh/g, a good cycle characteristic is obtained but the discharge capacity is small.

Specific examples of the invention are described, which should not be construed as limiting the invention thereto. Various variations may be possible without departing from the scope of the invention.

As will be apparent from the foregoing, the carbonaceous material of the invention contains phosphorus and the present invention can provide a carbonaceous material capable of doping lithium in large amounts.

According to the method of the invention, there can be prepared a carbonaceous material having good characteristics by a simple procedure and especially a carbonaceous material which has great capability of doping lithium and a good charge and discharge efficiency (de-doping/doping amounts).

In the non-aqueous electrolyte cell of the invention, the carbonaceous material having great capability of doping lithium and a good charge and discharge efficiency is used as a negative electrode whereby one can realize a charge and discharge capacity which is higher than the theoretical as in the case using graphite as a negative electrode. Thus, it is possible to provide the cell having excellent cycle characteristics and an excellent charge and discharge efficiency.

We claim as our invention:

1. A carbonaceous material having an interlayer spacing, $d_{002}$, of not less than 3.70 angstroms and a true density of less than 1.70 g/cm$^3$, having no exothermic peak at not less than 700° C. as measured by a differential thermal analysis in air stream, and containing from 0.2 to 5.0 weight % of phosphorus.

2. A carbonaceous material according to claim 1, wherein said carbonaceous material is obtained by carbonizing an organic material.

3. A carbonaceous material according to claim 2, wherein said organic material is a furan resin.

4. A carbonaceous material according to claim 2, wherein said organic material is a petroleum pitch having a H/C atomic ratio between 0.6 and 0.8 and containing functional groups containing oxygen.

5. A non-aqueous electrolyte cell comprising:
    an anode including a carbonaceous material amenable to doping and de-doping with Li;
    a cathode of a compound including Li for doping said carbonaceous material when a charge is applied to said non-acqueous electrolyte cell; and
    a non-aqueous electrolyte;
    wherein said carbonaceous material has an interlayer spacing, $d_{002}$, of not less than 3.70 angstroms and a true density of less than 1.70 g/cm$^3$, having no exothermic peak at not less than 700° C. as measured by a differential thermal analysis in air stream, and contains from 0.2 to 5.0 weight % of phosphorus.

6. A non-aqueous electrolyte cell according to claim 5, wherein said cathode contains Li in an amount of corresponding to the charge/discharge capacity of not less than 350 mAH per gram of said carbonaceous material.

7. A non-aqueous electrolyte cell according to claim 5, wherein said cathode contains Li in an amount corresponding to the charge/discharge capacity of not less than 350 mAH per gram of said carbonaceous material.

8. A non-aqueous electrolyte cell according to claim 5, wherein said cathode contains a cathode active material of the formula, $LiMO_2$, wherein M stands for at least one of Co and Ni.

* * * * *